United States Patent [19]
Bucksch

[11] 3,964,584
[45] June 22, 1976

[54] SPEED-CHANGING SYSTEM WITH TWO FLUID-ACTUATED CLUTCHES

[75] Inventor: Manfred Bucksch, Friedrichshafen, Germany

[73] Assignee: Zahnradfabrik Friedrichshafen AG, Friedrichshafen, Germany

[22] Filed: Dec. 23, 1974

[21] Appl. No.: 535,702

[30] Foreign Application Priority Data
Dec. 24, 1973 Germany............................ 2364541

[52] U.S. Cl. ............................................ 192/87.11
[51] Int. Cl.[2] ........................................ F16D 25/10
[58] Field of Search ...................... 192/87.11, 87.15

[56] References Cited
UNITED STATES PATENTS

| | | | |
|---|---|---|---|
| 3,138,964 | 6/1964 | Stockton...................... | 192/87.11 X |
| 3,279,573 | 10/1966 | Hensel........................... | 192/87.11 |
| 3,307,430 | 3/1967 | Bauder.......................... | 192/87.11 X |
| 3,710,650 | 1/1973 | Piret ............................ | 192/87.11 X |

*Primary Examiner*—Benjamin W. Wyche
*Attorney, Agent, or Firm*—Karl F. Ross; Herbert Dubno

[57] ABSTRACT

A planetary-gear coupling between a torque converter and a load, such as an automotive engine, comprises a transmission housing with two fluidically actuated clutches serving to couple an input shaft with either of two coaxial output shafts carrying respective sun gears of two planetary-gear trains. The input shaft, driven by the rotor of the torque converter, and a surrounding tube, secured to its stator, define between them an annular clearance bounded by two sealing rings, one of these rings being interposed as a journal bearing between the tube and a first clutch housing positively connected with the input shaft. The annular clearance can be pressurized from the output of a fluid pump and communicates through a bore in the first clutch housing with the interior thereof which contains a first piston displaceable to consolidate that housing with the inner output shaft. The outer output shaft, having an end splined to a surrounding second clutch housing, is journaled in a surrounding annular bearing within a transverse partition of the transmission housing, this partition having a central annular boss defining with a hub of the second clutch housing a ring channel communicating with a radial bore in the partition which can also be pressurized by the pump. The ring channel is open toward a longitudinal inner groove of the hub of the second clutch housing communicating with the interior of that housing through another bore, a second piston in this clutch housing being displaceable to consolidate same with the input shaft.

6 Claims, 2 Drawing Figures

3,964,584

SPEED-CHANGING SYSTEM WITH TWO FLUID-ACTUATED CLUTCHES

FIELD OF THE INVENTION

My present invention relates to a speed-changing system for transmitting torque from an engine, particularly one of the internal-combustion type, to a load such as the traction wheels of an automotive vehicle with a selectively variable speed ratio.

BACKGROUND OF THE INVENTION

In my prior U.S. Pat. No. 3,744,606 I have disclosed a dual hydraulic or pneumatic coupling for the selective fluidic actuation of two coupling devices such as clutches and/or brakes. In that prior patent I have also referred to several earlier U.S. patents, owned by the assignee of the present application, which described a variety of planetary-gear transmissions adapted to be used in such a system, generally in series with a hydraulic torque converter. Selection of three forward speed ratios and one reverse ratio is possible in such systems with the aid of two clutches and two brakes associated with two cascaded planetary-gear trains; with the addition of further planetary-gear trains and coupling devices, the number of available speed ratios can be extended. Typically, the two clutches serve for selectively connecting an input shaft (normally driven from the engine through the aforementioned torque converter) with either or both of the two output shafts carrying, for example, the sun gears of a pair of cascaded planetary-gear trains; the coaxially nested output shafts are in line with the input shaft. With the extremities of the nested output shafts suitably staggered, they can be alternatively or jointly coupled with an adjoining extremity of the input shaft while one of these output shafts, conveniently the outer one, can also be selectively immobilized by an associated brake.

Certain problems have heretofore arisen in the feeding of high-pressure fluid to the two clutch housings for the displacement of their associated pistons, in view of the fact that these clutch housings are positively coupled with respective shafts for joint rotation therewith. The expedient of admitting the fluid to these clutch housings through channels in the associated shafts has the drawback of appreciably weakening the shaft structure, which therefore must be made heavier than would otherwise be required, and also necessitates the provision of special seals on opposite sides of the port through which the high-pressure fluid exits from the shaft.

OBJECTS OF THE INVENTION

The general object of my present invention is to provide an improved structural arrangement in such a system simplifying the feeding of high-pressure fluid (referred to hereinafter as oil) to a pair of clutch housings, with avoidance of any significant weakening of elements serving for the transmission of torque.

A more particular object of this invention is to provide improved means for pressurizing a clutch housing (referred to hereinafter as the "first clutch housing") mounted on the input shaft of the speed-changing system.

SUMMARY OF THE INVENTION

I realize these objects, in conformity with my present invention, by the provision of a tube secured to a transmission housing which surrounds the two clutches, this tube being provided with bearing means for rotatably supporting the first clutch housing thereon. Advantageously, the tube defines with the input shaft an annular clearance forming part of a passage for admitting high-pressure oil to the first clutch housing by way of a bore formed therein. The tube is preferably provided with an outer sealing ring, forming bearing means for this clutch housing, and with an inner sealing ring, forming a journal bearing for the input shaft; the annular clearance between these shafts effectively extends around an end of the tube and is bounded by the two sealing rings which thus have the dual function of preventing oil leakage and serving as bearings for relatively rotating parts.

The outer clutch housing (referred to hereinafter as the second clutch housing), positively connected with the outer output shaft, may be pressurized by way of a ring channel defined by that housing with an adjoining transverse wall of the transmission housing in which the output shaft is journaled, as separately claimed in my copending application Ser. No. 535,701 of even data.

BRIEF DESCRIPTION OF THE DRAWING

The above and other features of my invention will now be described in full with reference to the accompanying drawing in which.

SPECIFIC DESCRIPTION

Figure 1:
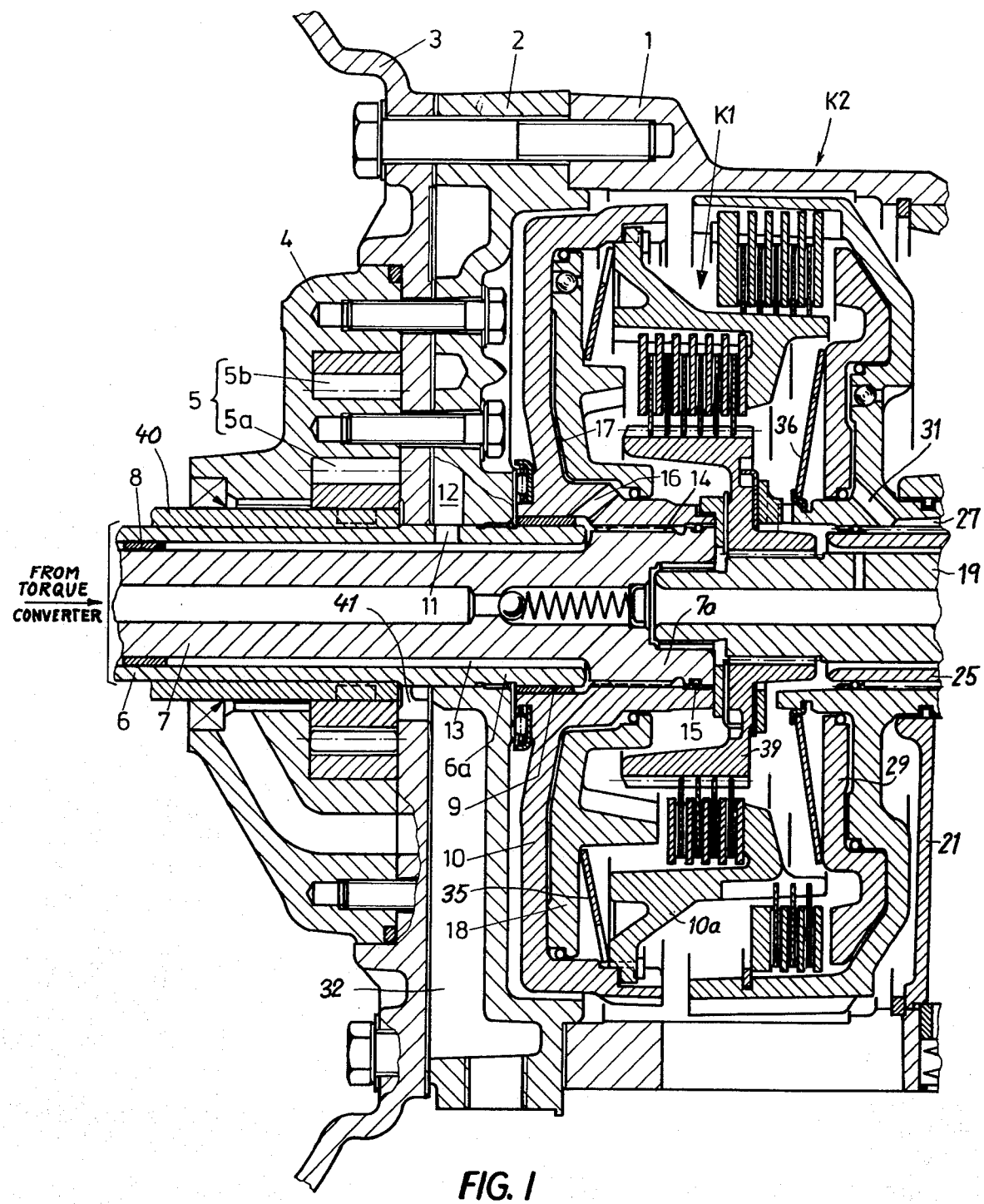
FIG. 1 is an axial sectional view of the left-hand portion of a speed-changing system embodying my invention, including two hydraulic clutches and a hydraulic brake.
Figure 2:
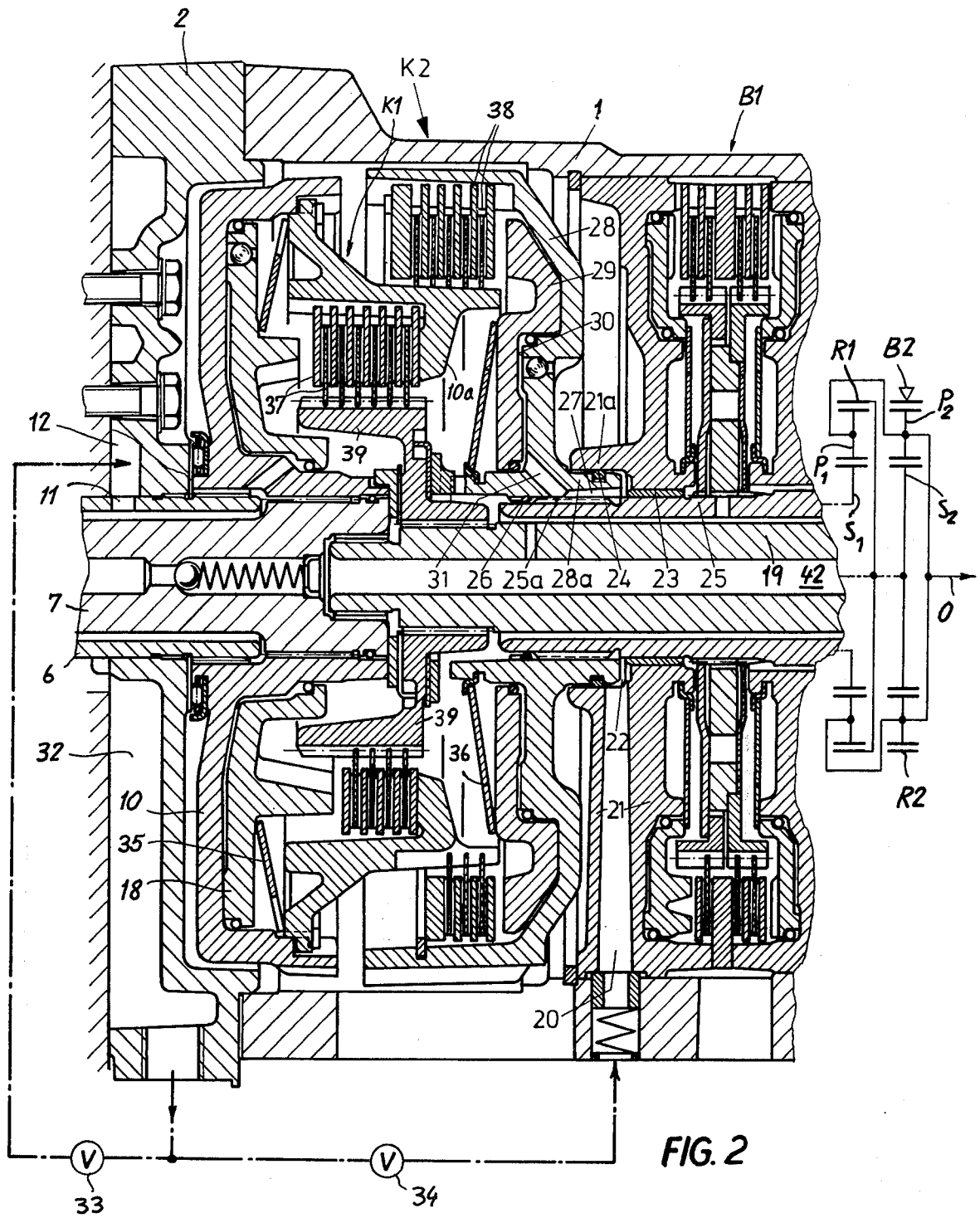
FIG. 2 is a view similar to FIG. 1, partly overlapping same and showing the right-hand portion of the system.

The system shown in the drawing comprises a transmission housing 1 enclosing the extremities of three coaxial shafts, namely an input shaft 7 and two nested output shafts 19, 25. Input shaft 7 is driven in the conventional way, e.g. as illustrated in commonly owned U.S. Pat. No. 3,593,599, from an internal-combustion engine via a hydraulic torque converter not further illustrated. Output shafts 19 and 25 serve as inputs for two cascaded planetary-gear trains here shown, by way of example, as being of the type disclosed in the same commonly owned patent, with sun gears $S_1$, $S_2$, planet gears $P_1$, $P_2$ and ring gears $R_1$, $R_2$, serving to drive a load shaft Q with a variable speed ratio as is well known per se. Sun gears $S_1$ and $S_2$ are keyed to outer output shaft 25 and inner output shaft 19, respectively, and can thus be driven independently or jointly under the control of hydraulic clutches K1 and K2 within transmission housing 1. This transmission housing also contains a conventional hydraulic brake B1, actuatable to arrest the outer shaft 25, and another such brake B2 illustrated only schematically and serving to immobilize the ring gear $R_2$. The planetary-gear system also includes one-way couplings, which have not been illustrated.

The clutches K1 and K2 are respectively provided with a first annular clutch housing 10, containing an axially slidable annular piston 18, and a second annular clutch housing 31, containing an axially slidable annular piston 29. Pistons 18 and 29 are normally held in a retracted position by respective Belleville springs 35, 36; when displaced by high-pressure fluid, as more fully described below, piston 18 engages a set of interleaved friction foils 37 whereas piston 29 engages a similar set of foils 38. Annular foils 37 are alternately mounted on the inner periphery of an extension 10a of first clutch housing 10 and on a collar 39 which is splined to the left-hand end of shaft 19, projecting beyond shaft 25, and effectively forms an extension thereof; annular foils 38 are alternately mounted on the outer periphery of the same clutch housing extension 10a and on the inner periphery of the second clutch housing 28. The first clutch housing 10 is splined at 14 to the right-hand end of input shaft 7; the second clutch housing 28 is similarly splined, at 25a, to the left-hand end of shaft 25.

Shaft 7 is rotatably journaled in a mounting tube 6 coaxially surrounding same with formation of an annular clearance 13 therebetween, this clearance extending around the end of tube 6 between the latter and an enlarged head 7a of shaft 7 carrying the clutch housing 10. Clearance 13 is bounded by two sealing rings 8 and 9 of low-friction material, ring 8 being press-fitted into tube 6 as a journal bearing for shaft 7 whereas ring 9 is press-fitted into a central bore of clutch housing 10 to serve as a counterbearing for that clutch housing and therefore also for the supporting extremity of shaft 7. Tube 6 and shaft 7 are respectively secured to the stator and the rotor of the preceding torque converter whose housing has been partly illustrated at 3, being bolted to transmission housing 1 through an end plate 2 of the latter; tube 6 may therefore be regarded as stationary, with reference to housing structure 1 – 3, even though this is not essential.

A tubular shaft 40, rotatably carried by tube 6, forms the input for a gear pump 5 whose housing 4 is bolted to plate 2, this gear pump having relatively eccentric toothed rings 5a and 5b meshing with each other in the lower part of housing 4. Oil delivered by pump 5 enters at 41 into a high-pressure port 32 from which it is distributed to other parts of the system, in particular to a first passage 12 and to a second passage 20 leading to the interior of clutch housings 10 and 28, respectively. The admission of oil to these passages is automatically controlled, e.g. in the manner described in the aforementioned U.S. Pat. No. 3,593,599, through valves indicated diagrammatically at 33 and 34.

The first passage 12 extends through a radial bore 11 in tube 6 into clearance 13 and thence via an oblique bore 16 of clutch housing 10 into the interior 17 thereof, to the left of its piston 18. Second passage 20, extending radially within a partition 21, terminates inside an annular boss 21a of this partition in a ring channel 22 which is defined by confronting faces of partition 21 and of a hub 28a of clutch housing 28 surrounded by boss 21a. The passage further extends into the interior 30 of clutch housing 28 through a slanting bore 31 thereof communicating with a groove 27 on the inner periphery of hub 28a, the bore 31 lying to the right of piston 29. A sealing ring 24 in an annular groove of hub 28a prevents the escape of oil from ring space 22. Partition 21 divides the interior of transmission housing 1 into a left-hand compartment, accommodating the clutches K1 and K2, and a right-hand compartment, accommodating the brake B1.

Partition 21 is formed with a central bore into which a bearing ring 23, similar to rings 8 and 9, is press-fitted to serve as a journal for the left-hand end of outer output shaft 25; ring 23 also prevents leakage from ring channel 22 to the low-pressure side of the system which includes a central bore 42 of shaft 19. In order to guard against oil leakage in the opposite direction, i.e. by way of splines 25a, a sealing ring 26 is interposed between shaft 25 and clutch housing 28 to the left of this spline coupling. Similarly, a sealing ring 15 prevents the outflow of oil via spline coupling 14 from clearance 13. These sealing rings could be omitted, of course, if the corresponding spline couplings were replaced by solid welding connection or the like.

I claim:
1. A speed-changing system comprising:
   an engine-driven input shaft;
   an inner output shaft and a surrounding outer output shaft coaxial with said input shaft;
   planetary-gear means connecting said output shafts to a load;
   a transmission housing surrounding parts of said input and output shafts;
   a first clutch in said transmission housing including a first clutch housing positively connected with an extremity of said input shaft, first coacting annular friction elements in said clutch housing and on an extremity of said inner output shaft, and a first piston in said first clutch housing actuatable for making said first friction elements effective to couple said input shaft with said inner output shaft;
   a second clutch in said transmission housing including a second clutch housing positively connected with an extremity of said outer output shaft, second coacting annular friction elements on said first clutch housing and in said second clutch housing, and a second piston in said second clutch housing actuatable for making said second friction elements effective to couple said input shaft with said outer output shaft;
   a source of high-pressure fluid provided with valve means for selectively admitting said fluid to a first and a second passage in said transmission housing respectively leading to said first and second clutch housings for selectively actuating said first and second pistons; and
   a tube secured to said transmission housing surrounding said input shaft, said tube being provided with bearing means for rotatably supporting said first clutch housing thereon, said tube defining with said input shaft an annular clearance forming part of said first passage, said first clutch housing being provided with a bore communicating with said clearance.

2. A system as defined in claim 1 wherein said tube is provided with an outer sealing ring forming said bearing means and with an inner sealing ring forming a journal bearing for said input shaft, said clearance extending around an end of said tube and being bounded by said sealing rings.

3. A system as defined in claim 2 wherein the connection between said input shaft and said first clutch housing comprises a spline coupling in line with said end of said tube, said input shaft and said first clutch housing being provided with an interposed sealing ring on the side of said spline coupling remote from said clearance.

4. A system as defined in claim 1 wherein said source comprises a rotary fluid pump surrounding said tube.

5. A system as defined in claim 1, further comprising a transverse wall of said transmission housing forming an annular bearing for said outer output shaft and defining with said second clutch housing a ring channel forming part of said second passage.

6. A speed-changing system comprising:
   an engine-driven input shaft;

an inner output shaft and a surrounding outer output shaft coaxial with said input shaft;

planetary-gear means connecting said output shafts to a load;

a transmission housing surrounding parts of said input and output shafts;

a first clutch in said transmission housing including a first clutch housing positively connected with an extremity of said input shaft, first coacting annular friction elements in said clutch housing and on an extremity of said inner output shaft, and a first piston in said first clutch housing actuatable for making said first friction elements effective to couple said input shaft with said inner output shaft;

a second clutch in said transmission housing including a second clutch housing positively connected with an extremity of said outer output shaft, second coacting annular friction elements on said first clutch housing and in said second clutch housing, and a second piston in said second clutch housing actuatable for making said second friction elements effective to couple said input shaft with said outer output shaft;

a source of high-pressure fluid provided with valve means for selectively admitting said fluid to a first and a second passage in said transmission housing respectively leading to said first and second clutch housings for selectively actuating said first and second pistons; and a tube secured to said transmission housing surrounding said input shaft, said tube being provided with bearing means for rotatably supporting said first clutch housing thereon, said transmission housing being provided with a transverse wall forming an annular bearing for said outer output shaft and defining with said second clutch housing a ring channel forming part of said second passage.

* * * * *